UNITED STATES PATENT OFFICE.

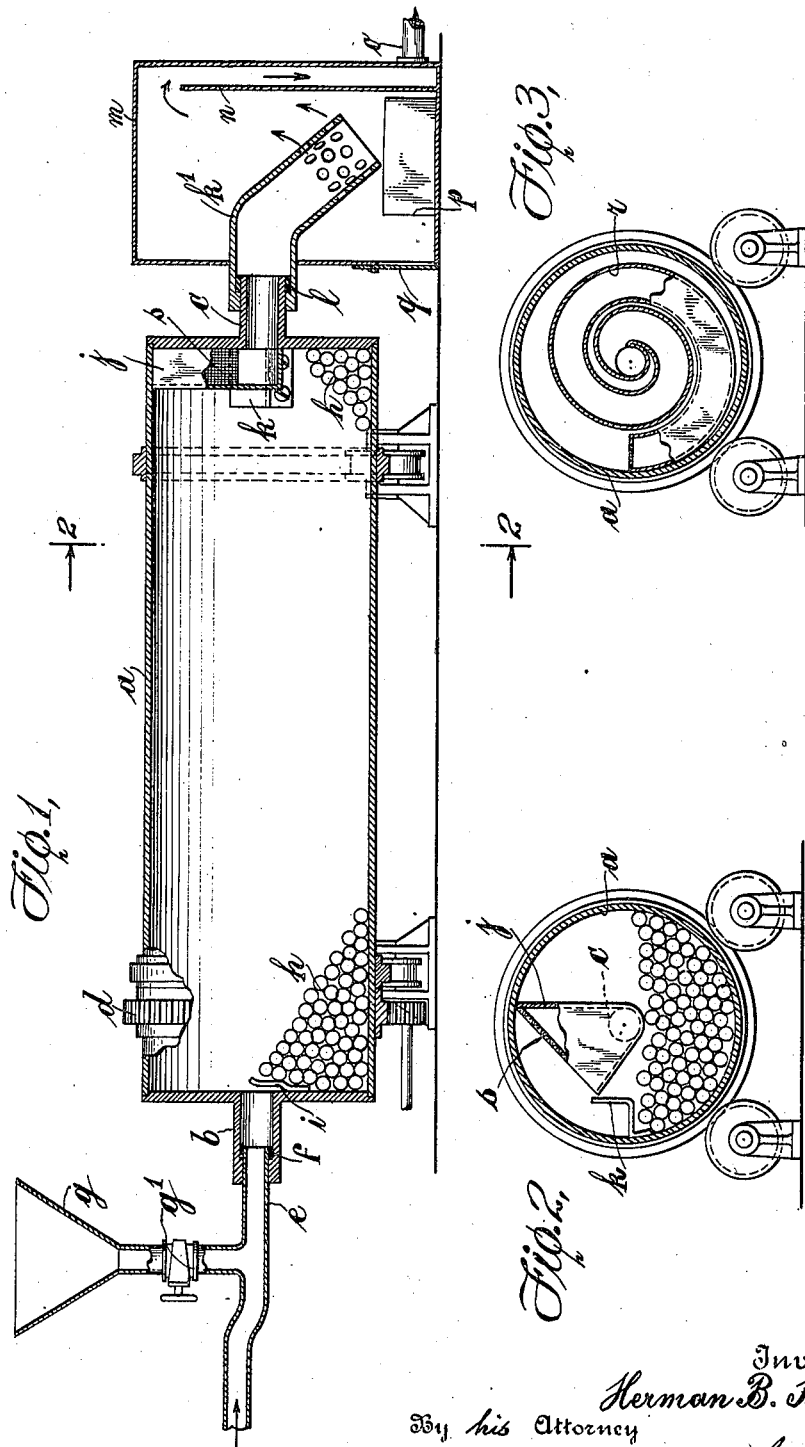

HERMAN B. KIPPER, OF NEW YORK, N. Y.

PROCESS OF PRODUCING CHLORIN AND SULFATE OF SODIUM BY CATALYSIS.

1,255,020.     Specification of Letters Patent.     Patented Jan. 29, 1918.

Application filed July 5, 1916. Serial No. 107,502.

*To all whom it may concern:*

Be it known that I, HERMAN B. KIPPER, a citizen of the United States of America, and a resident of New York, county and State of New York, have invented certain new and useful Improvements in Processes of Producing Chlorin and Sulfate of Sodium by Catalysis, of which the following is a specification.

This invention has reference to a novel process of producing chlorin gas and sodium sulfate. It consists essentially in the production of chlorin gas and sodium sulfate from sulfur dioxid and sodium chlorid in the presence of oxygen. These substances are made reactive by the presence of a catalytic agent employed in a novel manner.

Chlorin gas is largely used in chemical manufacture. Great quantities of the gas are used in the manufacture of bleaching powder. It is used further in various chemical and analytical processes. The chlorin gas is produced by my novel process in a constant flowing stream and the resulting sulfate of sodium is purer than the commercial sulfate of sodium found on the market, therefore it is preferable in chemical manufacture. Furthermore, all the chlorin contained in the sodium chlorid employed is obtained which implies cheap and simple manufacture.

Heretofore chlorin gas has been produced during the electrolytic process of producing caustic alkalis. This process of manufacture is, however, expensive. Chlorin gas has also been produced by the manganese process in which manganese tetra-chlorid is formed. This unstable compound decomposes according to the formula

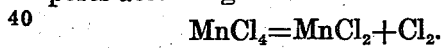
$$MnCl_4 = MnCl_2 + Cl_2.$$

Thus only 50% of the chlorin contained in the manganese tetra-chlorid is obtained which is naturally of disadvantage. Another known process of producing chlorin gas is based on the action of sulfur dioxid, water and atmospheric oxygen on sodium chlorid.

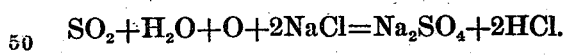
$$SO_2 + H_2O + O + 2NaCl = Na_2SO_4 + 2HCl.$$

The stream of hydrochloric acid gas secured is very irregular. The gas is, therefore, first absorbed or dissolved in sulfuric acid, from which, after saturation a constant flow of hydrochloric acid gas evolves. This method implies unnecessary chemical substances which increase labor and is therefore expensive. The hydrochloric acid formed is finally decomposed by oxygen in the presence of catalytic agents into chlorin and water.

In order to overcome the defects herein described I employ a catalyst such as ferric oxid, cobalt oxid, nickel oxid, manganese dioxid, or cupric oxid or mixtures of catalysts. Ferric oxid is preferred on account of its cheapness. It has been found that the chlorid, sulfur dioxid, and oxygen react in the presence of ferric oxid at high temperatures to form chlorin gas and sodium sulfate. The optimum temperature of this reaction is between 400 and 600° C.

It is probable that chemical reaction actually takes place between the iron oxid used as a catalyst and the reacting products somewhat according to the following steps: It will be noted that the iron oxid, however, remains chemically unchanged after the completion of the final reaction:

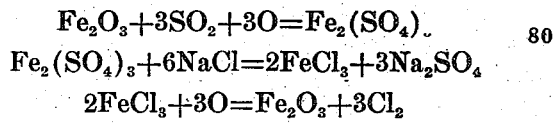
$$Fe_2O_3 + 3SO_2 + 3O = Fe_2(SO_4)_3$$
$$Fe_2(SO_4)_3 + 6NaCl = 2FeCl_3 + 3Na_2SO_4$$
$$2FeCl_3 + 3O = Fe_2O_3 + 3Cl_2$$

If desired the process may be started directly with the sulfate of iron whereby the process is somewhat simplified. This change would eliminate the reaction between ferric oxid and sulfur dioxid and oxygen found in the first of the three chemical equations above.

Thus the ferric oxid as the catalyst accelerates the chemical change without being itself permanently changed or consumed and the full percentage of the chlorin contained in the sodium chlorid is finally obtained.

In bringing about the reaction, the iron oxid has acted merely as a catalytic agent since it will be found unchanged at the conclusion of the reaction. If used in a finely divided form, the iron oxid used as catalyst contaminates the sodium sulfate formed and is separated from the latter with considerable difficulty. In order to overcome this difficulty, the catalytic agent is used as large solid lumps, or balls so that it can be readily separated from the finely divided sodium sulfate.

In order to produce these lumps or balls, I mix finely ground ferric oxid and sodium sulfate. The mixture is then compressed and heated to the fusion of the sodium sulfate.

A further composition used is obtained from ferric oxid $Fe_2O_3$, silicate of sodium $Na_2SiO_3$, and barium sulfate $BaSO_4$. This composition does not require heat for binding the lumps or balls together.

A third composition consists of ferric oxid and cement, which composition in the shaped form is merely allowed to set.

Another composition contains ferric oxid, cement, and sodium silicate. This composition also is allowed to set.

The novel process may be carried out in any suitable apparatus. One form of apparatus is diagrammatically illustrated in the accompanying drawing in which:

Figure 1 represents in longitudinal central section with some parts in elevation an apparatus for carrying the present invention into effect.

Fig. 2 is a cross section on line 2—2 of Fig. 1.

Fig. 3 shows mostly in sectional view a modified form of a detail part.

Similar characters of reference denote like parts in all the figures.

In the drawing $a$ represents a closed cylinder preferably of iron sheeting which is centrally provided, at one end, with an inlet tube $b$ and at the opposite end with a discharge tube $c$. The cylinder is rotatable by means of gearing $d$ in a similar manner as ore roasting cylinders are revolved. A tube $e$ reaches into the inlet tube $b$ and is secured therein by a gasket $f$ so that the tube $e$ does not rotate but is airtight therein. A hopper $g$ with a supply regulating valve $g^1$ communicates with the tube $e$. Through the hopper the sodium chlorid is introduced in powdered form. The tube $e$ is somewhat bent upwardly beyond the hopper and sulfur dioxid is introduced through the same. The lumps or balls $h$ acting as the catalyst or catalysts are placed into the cylinder so as to fill it about half. Near the inlet tube $b$ on the inside of the cylinder end there is an iron flange $i$ which prevents the lumps or balls from entering the inlet tube $b$.

Within the cylinder and near the discharge tube $c$ there is a flange $j$ best shown in Fig. 2. The flange is secured with one end to the inner surface of the cylinder. It is curved around the discharge opening and extends toward the inner cylinder surface for a certain length. A channel iron $k$ is mounted on the inner cylinder surface so that its end and the free end of the curved flange are in close proximity. During rotation the sodium sulfate formed reaches this channel iron and is thrown onto the curved flange from where it falls out through the discharge tube $c$. A stationary tube $k^1$ is secured to the rotating discharge tube $c$ by means of a gasket $l$. The tube reaches into a housing $m$ provided with a partition $n$ and an outlet tube $o$. The tube $k^1$ is perforated so as to allow the chlorin gas formed to pass out in the direction of the arrows. The chlorin finally passes out through the outlet tube $o$. The sulfate of sodium is collected in a vessel $p$ which may be inserted and removed through the door $q$.

In place of the curved flange $j$ a spiral arrangement $r$ may be employed which transports the sulfate of sodium to the discharge tube $c$. In either case the curved flange or spiral device are covered with net work as indicated at $s$ in Fig. 2 for the purpose of preventing the lumps or balls from entering the discharge section of the apparatus or leaving the cylinder. Any sulfate of sodium mixed with the solid lumps or balls is easily separated in a mechanical manner.

The sulfate dioxid gas and an excess of air enter the reaction cylinder $a$ at a temperature of approximately 600° C. The cylinder $a$ is also externally heated. The process of producing chlorin and sulfate of sodium is initiated and propagated at a temperature of from 200 to 900° C. but takes place uniformly at a temperature of about 600° C. within the cylinder or drum by means of a catalyst or catalysts and the resulting gas and salt discharge through the discharge tube.

It will be noted that in the present process of producing chlorin gas and sulfate of sodium a solid substance and gases are made to react in the presence of a moving catalytic substance which moves during the rotation of the drum or cylinder. The power of such substance for catalytic action is increased by the actual motion of the catalyst. This feature of the present process is entirely novel.

I claim as my invention:

1. The process of transforming sodium chlorid, sulfur dioxid and oxygen into chlorin and sodium sulfate in one continuous operation which comprises mixing a catalyst with the sodium chlorid, applying heat, agitating the mixture and bringing sulfur dioxid and oxygen into contact therewith.

2. The process of transforming sodium chlorid, sulfur dioxid and oxygen into chlorin and sodium sulfate in one continuous operation which comprises mixing a catalyst with the sodium chlorid, heating the mixture to a temperature of from 200 to 900° C., agitating the mixture and bringing sulfur dioxid and oxygen into contact therewith.

3. The process of transforming sodium chlorid, sulfur dioxid and oxygen into chlorin and sodium sulfate in one continuous operation which comprises mixing a catalyst with the sodium chlorid, maintaining this mixture at a temperature of approximately 600° C., agitating the mixture and bringing sulfur dioxid and oxygen into contact therewith.

4. The process of transforming sodium chlorid, sulfur dioxid and oxygen into chlorin and sodium sulfate by catalysis in one continuous operation which comprises mixing ferric oxid with the sodium chlorid, applying heat, agitating the mixture and bringing sulfur dioxid and oxygen into contact therewith.

5. The process of transforming sodium chlorid, sulfur dioxid and oxygen into chlorin and sodium sulfate by catalysis in one continuous operation which comprises mixing ferric oxid with the sodium chlorid, maintaining this mixture at a temperature of approximately 600° C., agitating the mixture and bringing sulfur dioxid and oxygen into contact therewith.

6. The process of transforming sodium chlorid, sulfur dioxid and oxygen into chlorin and sodium sulfate by catalysis in one continuous operation which comprises mixing a catalyst in form of lumps, composed of ferric oxid and a binding mineral substance, with the sodium chlorid, maintaining this mixture at a temperature of approximately 600° C., while agitating it and bringing sulfur dioxid and oxygen into contact therewith.

7. The process of transforming sodium chlorid, sulfur dioxid and oxygen into chlorin, and sodium sulfate which comprises mixing a catalyst existing in the form of lumps, composed of ferric oxid and sodium sulfate, with the sodium chlorid, maintaining this mixture at a temperature of approximately 600° C., while agitating it, and bringing sulfur dioxid and oxygen into contact therewith.

8. The process of transforming sodium chlorid, sulfur dioxid and oxygen into a constantly flowing stream of chlorin gas and sodium sulfate by catalysis consisting in mixing lumps, composed of ferric oxid and sodium sulfate with the sodium chlorid, propagating the reaction at approximately a temperature of 600° C., while agitating this mixture, collecting the sodium sulfate formed, and conducting the chlorin gas away.

9. In the process of transforming sodium chlorid, sulfur dioxid and oxygen into chlorin and sodium sulfate, the step of mixing a catalyst with the sodium chlorid, heating this mixture, agitating it, bringing sulfur dioxid and oxygen into contact with the mixture and propagating the reaction by means of the moving catalyst therein.

Signed at New York, N. Y., this 20th day of June 1916.

HERMAN B. KIPPER.

Witnesses:
HENRY STEINMETZ,
LILLEY E. SCHMIDT.